United States Patent [19]

Allen

[11] Patent Number: 4,962,805
[45] Date of Patent: Oct. 16, 1990

[54] FURNITURE CONNECTOR

[75] Inventor: John M. Allen, Tacoma, Wash.

[73] Assignee: Lunstead, Inc., Kent, Wash.

[21] Appl. No.: 131,934

[22] Filed: Dec. 11, 1987

[51] Int. Cl.$^5$ .............................................. A47G 5/00
[52] U.S. Cl. ..................................... 160/135; 52/239;
403/295; 74/625
[58] Field of Search ................ 160/135, 351; 403/292,
403/295, 297; 52/239; 24/453, 615, 625;
211/182, 189

[56] References Cited

U.S. PATENT DOCUMENTS

| | | | |
|---|---|---|---|
| 3,977,800 | 8/1976 | Cassel | 403/297 X |
| 4,045,104 | 8/1977 | Peterson | 211/182 X |
| 4,323,319 | 4/1982 | Adams | 403/295 X |
| 4,601,137 | 7/1986 | Bates | 52/239 X |
| 4,651,390 | 3/1987 | Skobel | 24/625 |

FOREIGN PATENT DOCUMENTS 1223738  3/1971  United Kingdom ............. 248/221.3

Primary Examiner—Blair M. Johnson
Attorney, Agent, or Firm—Seed and Berry

[57] ABSTRACT

Novel apparatus is disclosed for constructing modular-type room divider furniture. The structure includes a plurality of panels each having frame members with at least one frame member having an open end defining a channel therethrough and an aperture in a sidewall thereof spaced from the open end. The apparatus further includes a clip with first and second arms securely attached to a body portion. The second arm of the clip includes a projecting lock portion. The second arm is also flexible to allow the lock portion to be inserted in the channel of the frame member and to further bias the lock portion such that it engages the aperture of the frame member thereby to lock the clip to the panel frame member. The structure may further include a support member adapted to receive the clip and including a plurality of apertures for receiving a supporting bracket. The support brackets may be used to support cabinets, shelving or other similar office furniture units.

23 Claims, 2 Drawing Sheets

FURNITURE CONNECTOR

TECHNICAL FIELD

The present invention is directed in general toward modular office furniture and, more particularly, toward method and apparatus for providing modular office furniture which is easily constructed, dismantled and reconstructed.

BACKGROUND OF THE INVENTION

In recent years, the use of modular furniture has allowed flexibility and efficiency in the design of the office workplace. Modular furniture typically comprises walls or panels which are used to divide an open room thereby providing individual office spaces for employees and desired employee privacy. Since these panels typically do not span the entire height of the room, a desired openness is maintained. The panels are constructed from standard materials, thus they are cheaper than providing individual offices for each employee. If it is desired to reconfigure the office or move to a new location, the panels can be disassembled and reassembled with the desired layout. Accordingly, modular furniture using divider panels has become widely accepted.

Presently available systems for constructing office divider panels are typically provided in rectangular structures which may be assembled in a variety of manners. Assembly often requires securing panels together using nails, screws, or other semi-permanent coupling apparatus. Assembly of these panels can be time consuming as well as difficult. In like manner, disassembly of the panels can be as time consuming and difficult. Further, assembly of presently available room dividers normally precludes dismantling and subsequent reassembly in an alternative configuration. This is due in large measure to the need to provide holes and securing devices for the semi-permanent securing apparatus.

It is, therefore, desirable to provide divider panels and other types of modular office furniture which can be quickly and easily assembled. It is also desirable to provide modular office furniture which can be quickly and easily disassembled. The modular office furniture, once dismantled, should be capable of convenient reassembly in alternative configurations.

DISCLOSURE OF THE INVENTION

It is, therefore, an object of the present invention to provide apparatus for quickly assembling and disassembling modular office furniture. Once dismantled, the office furniture should be easily and quickly reassemblable in alternative configurations.

In order to meet the above-noted objects of the present invention, a connector clip and cooperating frame are provided for use in construction of generally vertically oriented modular divider panels and other office furniture. The modular panels are of the type having frame members wherein the frame members have open ends and apertured channels. The clip which is the object of the present invention has a body which may include a post member adapted to couple with an upright shelf support member. The clip includes a first arm which is rigidly secured to the body and adapted to fit interior of a frame member channel through an open end of the channel. The clip further includes a second arm secured to the body and extending therefrom generally in parallel alignment with the first arm and spaced apart therefrom. The second arm is also adapted to fit interior of the frame member channel through the open channel end. Further, the second arm is resilient and includes a projecting lock member which is adapted to couple with an aperture of the frame channel inward from the open channel end. The resiliency of the second arm biases the projecting lock member into the aperture during assembly and holds it positioned therein during use. In this manner, the clip first and second arms can be inserted into the open channel end of the panel frame member channel and the clip secured to the frame member channel by the projecting lock member of the second arm. The post member projects from the body at generally a right angle to the first and second arms and is generally coplanar with the panel to which the clip is connected. When a pair of upper and lower clips are used, the post members of each project toward each other and are inserted into opposite open ends of the shelf support member to hold the support member in place between the clips with a vertical orientation. The panel may include an edge recess to receive the clips and support member so that they are out of sight of the user.

In alternative embodiments, the clip further includes a third arm rigidly secured to the body and extending in a direction at a desired angle from the first arm. Like the first arm, the third arm is adapted to fit interior of a frame member channel of a second panel to be held edgewise adjacent to the first panel. A resilient fourth arm is also secured to the body and extends therefrom generally parallel the third arm. The fourth arm is adapted to fit interior of the frame member channel of the second panel. The fourth arm includes a projecting lock member, as does the second arm, which is adapted to couple with an aperture of the frame member of the second panel to secure the clip to the second panel. Thus the first and second panels are securely but releasably connected together. The first and third arms are secured to the body such that they are at a predetermined angle relative to each other to hold the first and second panels at this same angle.

BRIEF DESCRIPTION OF THE DRAWINGS

Subject matter which is regarded to be the invention is particularly pointed out and distinctly claimed in the numbered paragraphs appended hereto. The invention, however, both as to organization and method of practice, may best be understood from a reading of the following detailed description taken in conjunction with the drawings in which:

BEST MODE FOR CARRYING OUT THE INVENTION

Figure 1:
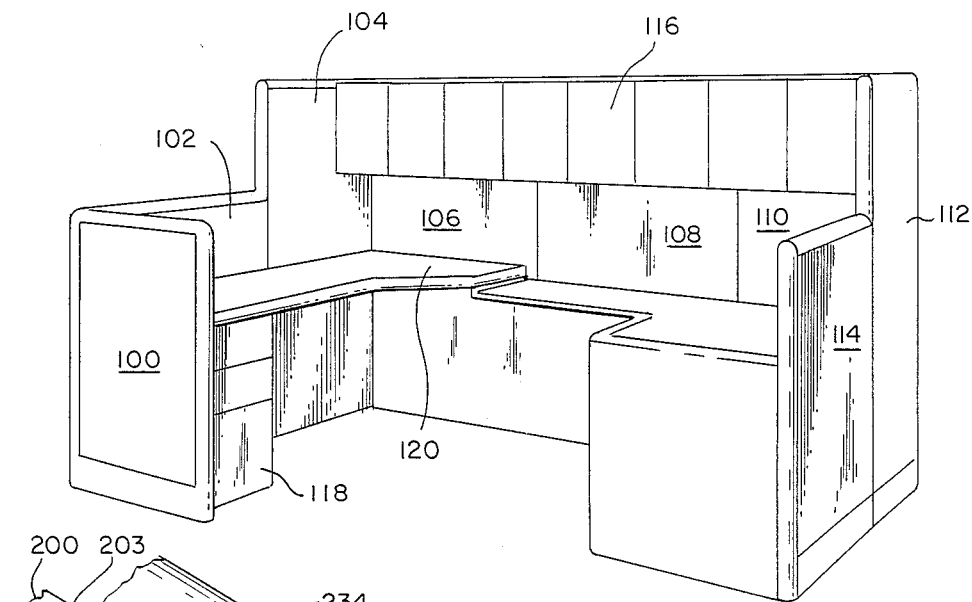
FIG. 1 is a perspective view of an office work station constructed of modular panels connected together by clips which are the subject of the present invention.

A general illustration of the modular-type divider panels which are the subject of the present invention is provided in FIG. 1. Therein a plurality of vertically oriented panels 100 through 114 are constructed to provide a modular work station. Panels 106, 108 and 110 further include hanging cabinets 116. Lower cabinets 118 and work surfaces 120 are also secured to the panels in a manner which will be described more fully below.

Figure 2:
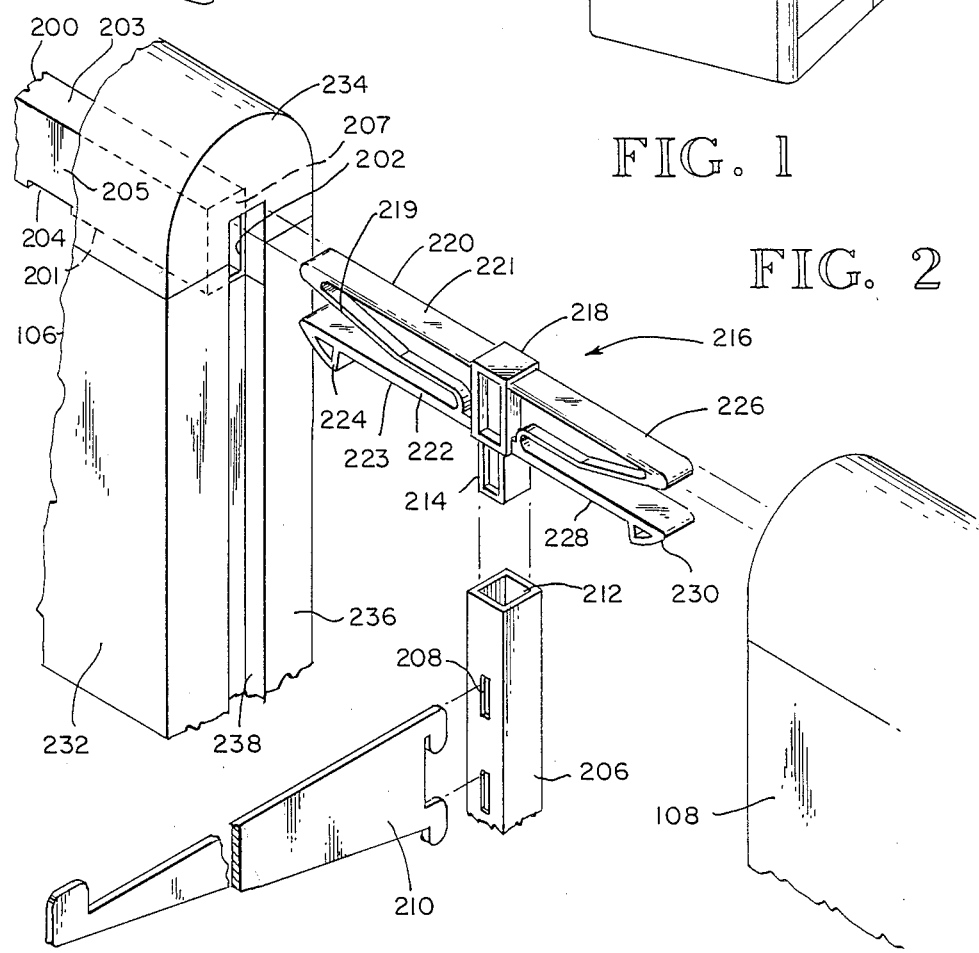
FIG. 2 is an enlarged, fragmentary exploded view of the joining clip and two panel members which are the subject of the present invention.

FIG. 2 provides an enlarged, fragmentary exploded view of the interface of panels 106 and 108. Each panel 106 and 108 includes a frame member 200 which provides structural integrity to the panels. The frame member 200 has an open end 202 which defines a channel portion of the frame member. The frame member 200 also has first and second pairs of sidewalls 201, 203 and 205, 207 wherein the sidewall 201 has an aperture 204 disposed inward from the frame member open end 202. While only one frame member is illustrated for panel 106 of FIG. 2, it will be appreciated by those skilled in the art that each panel may include a plurality of frame members. In the presently preferred embodiment, each panel includes at least an apertured upper frame member and an apertured lower frame member.

A support member 206 is located intermediate panels 106 and 108 when they are edgewise connected together. The support member 206 is constructed with a length substantially equal to the distance between the upper and lower frame members of the panel 106. The support member 206 includes a plurality of slots 208 which are adapted to receive supporting brackets 210. The supporting member 206 and the supporting brackets 210 cooperate to support the hanging cabinets 116, the lower cabinets 118 and the work surfaces 120 illustrated in FIG. 1. In addition to the cabinets and work surfaces illustrated in FIG. 1, the support members 206 in cooperation with the supporting brackets 210 may be used to support shelves or other structures which are desired to be used in combination with the modular panels.

The support member 206 includes at each end thereof an open end 212 which defines a channel. The open end 212 of the support member 206 is provided for receiving a post member 214 of a connector clip 216. The connector clip 216 cooperates with the frame members of the panels to releasably lock the panel 106 to the panel 108. A body portion 218 of the clip 216 has connected thereto a rigid arm 220. The arm 220 extends from the body portion 218 and is adapted to project interior of the frame member channel 202. The clip 216 further includes a resilient arm 222 which is connected to the body portion 218 and which extends therefrom in the same general direction as the rigid arm 220. The second arm is also adapted to project interior of the channel portion 202 of the frame member 200 in a manner similar to the rigid arm 220. The resilient arm 222 is spaced from the rigid arm 220 to allow movement of the resilient arm relative to the rigid arm.

Figure 3:
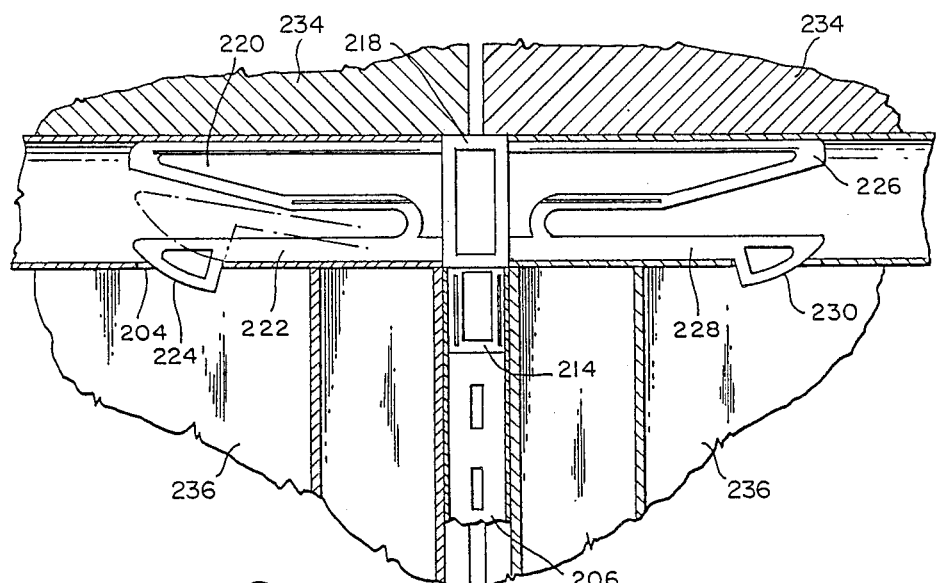
FIG. 3 is an enlarged, fragmentary sectional view of the joining clip and panel members of FIG. 2 shown assembled.

The resilient arm 222 includes a projecting lock member 224 which cooperates with the aperture 204 of the panel frame member 200 to secure the clip 216 to the panel 106. As illustrated in FIG. 3, the arm 222 is resilient enough to deflect toward the rigid arm 220 upon insertion of the clip 216 into the frame member 200 to allow insertion of lock member 224. Further, when the lock member 224 reaches the aperture 204 of the frame member 200, the resiliency of the arm 222 biases the lock member 224 into the aperture 204 of the frame member such that the lock member is held within the aperture during normal use of the panel.

The resiliency of the arm 222 further allows for removal of the clip 216 from the frame member 200 by applying sufficient force to the lock member 224 to release the lock member from the aperture 204.

The arm 220 has a free end portion 219 distal from the body portion 218 with a surface that faces the resilient arm 222. The surface of the arm 220 further slopes away from the arm 222 in the direction toward the free end portion 219 of the first arm 220 to allow sufficient movement of the arm 222 such that the clip 216 may be inserted and released from the frame member 200 without interference from the arm 220.

Each arm 220 and 222 includes oppositely facing engagement surfaces 221 and 223. The surfaces 221 and 223 engage the sidewalls 201 and 203 of the frame member 200 when the clip 216 is inserted in the frame member and the lock member 224 is secured in the aperture 204. The engagement of the surfaces 221 and 223 with the frame member sidewalls 201 and 203 provides a snug fit between the clip 216 and the panel frame member 200. In similiar manner the arms 220 and 222 each include oppositely facing side engagement surfaces for engaging the second sidewalls 215 and 217 when the clip is inserted in the frame member channel 202. Like surfaces 221 and 223, the side engagement surfaces of the clip 216 provide a snug fit between the clip and the panel frame member 200. The snug fit of the clip with the frame member not only improves the strength of the resulting structure but also helps to align the lock member 224 with the aperture 204 for quick insertion of the clip 216.

Figure 4:
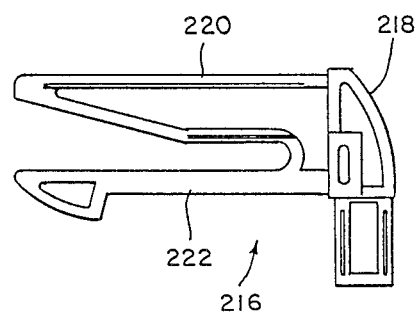
FIG. 4 is a side elevational view of an alternative embodiment of the joining clip which is the subject of the present invention.

The clip 216 further includes a rigid arm 226, a resilient arm 228 and a lock member 230 which are constructed to function in the same manner as the arm 220, the arm 222 and the lock member 224, respectively. The arms 226 and 228 are connected to the body 218 of the clip 216 at a predetermined angle relative to the arms 220 and 222. As shown in FIG. 2, the predetermined angle is 180 degrees. It will be apparent to those skilled in the art, however, that the angle may be 45 degrees, 90 degrees or any other desired angle. Further, the clip 216 may include only a single rigid arm 220 and a single resilient arm 222 connected to the body portion 218, as shown in FIG. 4.

In the preferred embodiment, the arms 220, 222, 226 and 228 are each integrally formed with the body 218 and post member 214 of the clip 216. However, the arms and the support post of the clip may be connected to the body in any manner to provide sufficient rigidity to the clip such that the clip may be used to assemble two panels.

Returning to FIG. 2, the panel 106 further includes removable panel covers 232, 234 and 236. The panel covers are releasably attached to the panel frame members to allow access to the aperture 204 of the frame member 200. The panel coverings are also constructed to extend beyond the frame members to create a recess 238 in the edge portion of the panel for receiving the support member 206 and the body portion 218 of the clip 216 such that the support member and the clip are substantially hidden from the view of the user.

It will be apparent to those skilled in the art that although the panels 106 and 108 have been shown and described by reference to only a single clip 216 for joining the tops of the panels, a second clip can readily be provided for insertion to the bottom open end of support member 206 and engagement with lower frame members in the same manner that clip 216 engages the upper frame members of panels 106 and 108.

While only several presently preferred embodiments of the novel furniture connector are provided in detail herein, many modifications in variations will readily be apparent to those skilled in the art. The appended claims are intended to embody all such modifications and variations which fall within the true scope and spirit of the invention as described herein.

I claim:

1. A clip for assembling generally vertically oriented modular panels of the type used for room dividers wherein each panel includes frame members, at least one of the frame members being a generally horizontal channel having an open end and an aperture in a sidewall thereof positioned inward from the open channel end, the vertical panels being usable with a support member to which a shelf or other device may be connected for support, the clip comprising:

a body;

a connector member rigidly connected to said body and adapted to coupled with the support member;

a rigid first arm rigidly secured to said body member and extending therefrom, said first arm being adapted to project interior of the frame member of a first panel through the open end thereof;

a second arm secured to said body and extending therefrom in the same general direction as said first arm and spaced therefrom for movement relative to said first arm, said second arm being adapted to project interior of the first panel frame member channel through the open end thereof, said second arm including a projecting lock member adapted to project into the aperture of the first panel frame member channel and prevent removal of said first and second arms from the first panel frame member channel once inserted during normal use of the first panel, said second arm being movable toward said first ram sufficient to permit insertion of said first and second arms into the first panel frame member channel and having sufficient resiliency to bias said projecting lock member into the aperture of the first panel frame member channel when aligned therewith and removably hold said projecting lock member locked within the aperture during normal use of the first panel, said resilient second arm being movable toward said first arm upon selective application of a sufficient actuation release force to remove said projecting lock member from the aperture when it is desired to disconnect the clip from the first panel frame member channel, whereby the clip can be detachably locked to the first panel;

a rigid third arm rigidly secured to said body and extending therefrom, said third arm being adapted to project interior of the frame member channel of a second panel through the open end thereof; and a fourth arm secured to said body and extending therefrom in the same general direction as said third arm and spaced therefrom for movement relative to said third arm, said fourth arm being adapted to project interior of the second panel frame member channel through the open end thereof, said fourth arm including a projecting lock member adapted to project into the aperture of the second panel frame member channel and prevent removal of said third and fourth arms from the second panel frame member channel once inserted during normal use of the second panel, said fourth arm being movable toward said third arm sufficient to permit insertion of said third and fourth arms into the second panel frame member channel and having sufficient resiliency to bias said projecting lock member into the aperture of the second panel frame member channel when aligned therewith and removably hold said projecting lock member locked within the aperture during normal use of the second panel, said resilient fourth arm being movable toward said third arm to permit upon selective application of a sufficient actuation release force to remove said projecting lock member from the aperture when it is desired to disconnect the clip from the second panel frame member channel, whereby the clip can be detachably locked to the second panel and thus the first and second panels detachably locked together and held in a desired alignment by the clip, said first and third arms being secured to said body at a predetermined angle to lock the first and second panels together at said predetermined angle.

2. The clip as recited in claim 1 wherein said body has an engagement portion positioned to engage the first panel frame member channel and limit movement of said first and second arms therein to properly align said projecting lock member with the aperture of the first panel frame member channel.

3. The clip as recited in claim 1 wherein said predetermined angle of said first and third arms is substantially 180 degrees.

4. The clip as recited in claim 1 wherein said first, second, third and fourth arms are integrally constructed with said body and said connection member.

5. The clip as recited in claim 1 wherein said first and second arms are integrally constructed with said body and said connection member.

6. The clip as recited in claim 1 wherein said connector member projects from said body at substantially a 90 degree angle relative to the direction of projection of said first arm.

7. The clip as recited in claim 1 wherein said first arm has a free end portion distal from said body with a surface portion facing generally toward said second arm and sloping away from said second arm in a direction toward the free end portion of said first arm to allow sufficient movement of said second arm toward said first arm to remove said projecting lock member from the aperture without interference by said first arm.

8. The clip as recited in claim 1 for use with the first panel frame member channel having a first pair of sidewalls, one sidewall being the sidewall with the aperture to receive said projecting lock member, the first pair of channel sidewalls being opposed and spaced apart from each other, each of the first pair of channel sidewalls having an interior sidewall surface facing toward the other, wherein said first and second arms each have an oppositely facing engagement surface extending at least a portion of the length thereof such that when said first and second arms are inserted within the first panel frame member channel with said projecting lock member in the aperture, said first and second arm engagement surfaces are positioned in juxtaposition with and engaging a corresponding one of the interior surfaces of the first pair of channel sidewalls to snuggly hold the clip against movement in the direction between the first pair of channel sidewalls within the frame member channel.

9. The clip as recited in claim 8 for use with the first panel frame member channel having a second pair of sidewalls positioned in planes generally perpendicular to the first pair of channel sidewalls, the second pair of channel sidewalls being opposed and spaced apart from each other, each of the second pair of channel sidewalls having an interior sidewall surface facing toward the other, wherein said first and second arms each have an oppositely facing side engagement surface extending at least a portion of the length thereof such that when said first and second arms are inserted within the first panel frame member channel with said projecting lock member in the aperture, said first and second arm side engagement surfaces are positioned in juxtaposition with and engaging a corresponding one of the interior surfaces of the second pair of channel sidewalls to snuggly hold the clip within the frame member channel against movement in the direction between the second pair of channel sidewalls.

10. Apparatus for constructing room dividers comprising:
a generally vertical orientable panel having frame members, said panel frame members including at least upper and lower generally horizontal frame members when said panel is generally vertically oriented, each said frame member having an end channel portion with an open end and an aperture in a sidewall thereof positioned inward from said open end;
an upright support member having a length substantially equal to the distance between said upper and lower frame member channel portions, said support member being positionable on edge of said panel for connection of a shelf or other device thereto for support;
upper and lower clips for releasable attachment to said panel, each said upper and lower clips comprising:
a body;
a rigid first arm rigidly secured to said body member and extending therefrom, said first arm being adapted to project interior of said frame member channel portion of said panel through said open end thereof;
a second arm secured to said body and extending therefrom in the same general direction as said first arm and spaced therefrom for movement relative to said first arm, said second arm being adapted to project interior of said panel frame member channel portion through said open end thereof, said second arm including a projecting lock member adapted to project into said aperture of said first panel frame member channel portion and prevent removal of said first and second arms from said panel frame member channel portion once inserted during normal use of said panel, said second arm being movable toward said first arm sufficient to permit insertion of said first and second arms into said panel frame member channel portion and having sufficient resiliency to bias said projecting lock member into said aperture of said panel frame member channel portion when aligned therewith and removably hold said projecting lock member locked within the aperture during normal use of said panel, said resilient second arm being movable toward said first arm upon selective application of a sufficient actuation release force to remove said projecting lock member from said aperture when it is desired to disconnect said clip from said panel frame member channel portion; and
a connection member rigidly connected to said body and projecting therefrom at a substantially 90 degree angle relative to said first arm, said connection member being adapted to couple with one end portion of said support member.

11. A clip for assembling generally vertically orientable modular panels of the type used for room dividers wherein each panel includes frame members, when the panel is generally vertically oriented at least one of the frame members being a generally horizontal channel having an open end and an aperture in a sidewall thereof positioned inward from the open channel end, the clip comprising:
a body;
a rigid first arm rigidly secured to said body member and extending therefrom, said first arm being adapted to project interior of the frame member channel of a first panel through the open end thereof;
a second arm secured to said body and extending therefrom in the same general direction as said first arm and spaced therefrom for movement relative to said first arm, said second arm being adapted to project interior of the first panel frame member channel through the open end thereof, said second arm including a projecting lock member adapted to project into the aperture of the first panel frame member channel and prevent removal of said first and second arms from the first panel frame member channel once inserted during normal use of the first panel, said second arm being movable toward said first arm sufficient to permit insertion of said first and second arms into the first panel frame member channel and having sufficient resiliency to bias said projecting lock member into the aperture of the first panel frame member channel when aligned therewith and removably hold said projecting lock member locked within the aperture during normal use of the first panel, said resilient second arm being movable toward said first arm upon selective application of a sufficient actuation release force to remove said projecting lock member from the aperture when it is desired to disconnect the clip from the first panel frame member channel, whereby the clip can be detachably locked to the first panel;
a rigid third arm rigidly secured to said body and extending therefrom, said third arm being adapted to project interior of the frame member channel of a second panel through the open end thereof; and
a fourth arm secured to said body and extending therefrom in the same general direction as said third arm and spaced therefrom for movement relative to said third arm, said fourth arm being adapted to project interior of the second panel frame member channel through the open end thereof, said fourth arm including a projecting lock member adapted to project into the aperture of the second panel frame member channel and prevent removal of said third and fourth arms from the second panel frame member channel once inserted during normal use of the second panel, said fourth arm being movable toward said third arm sufficient to permit insertion f said third and fourth arms into the second panel frame member channel and having sufficient resiliency to bias said projecting lock member into the aperture of the second panel frame member channel when aligned therewith and removably hold said projecting lock member locked within the aperture during normal use of the second panel, said resilient fourth arm being movable toward said third arm to permit upon selective application of a sufficient actuation release force to remove said projecting lock member from the aperture when it is desired to disconnect the clip from the second panel frame member channel, whereby the clip can be detachably locked to the second panel and thus the first and second panels detachably locked together and held in a desired alignment by the clip, said first and third arms being secured to said body at a predetermined angle to lock the first and second panels together at said predetermined angle.

12. The clip as recited in claim 11 wherein said predetermined angle of said first and third arms is substantially 180 degrees.

13. The clip as recited in claim 11 wherein said first, second, third and fourth arms are integrally constructed with said body.

14. The clip as recited in claim 11 for use with a support member to which a shelf or other device may be connected for support, the clip further includes a connection member rigidly connected to said body and adapted to couple with the support member.

15. Apparatus for constructing room dividers comprising:
    first and second panels each having panel frame members, said panel frame members including at least upper and lower generally horizontal frame members when said panels are generally vertically oriented, each said frame member having an end channel portion with an open end and an aperture in a sidewall thereof positioned inward from said open end, said open channel ends being positioned toward said adjacent panel edge portions, said first and second panels each having an edge portion positionable edgewise adjacent said edge portion of the other of said panels;
    an upright support member having a length substantially equal to the distance between said upper and lower frame member channel portions said upper member being positionable between said first and second panel edge portions for connection of a shelf or other device thereto for support;
    upper and lower clips for releasably joining said first and second panels together in a rigid manner, said upper clip securing said upper horizontal frame members of said first and second panels together and said lower clip securing said lower horizontal frame members of said first and second panels together, each said upper and lower clips comprising:
    a body;
    a connection member rigidly connected to said boy and adapted to couple with one end portion of said support member;
    a rigid first arm rigidly secured to said body member and extending therefrom, said first arm being adapted to project interior of said frame member channel portion of said first panel through said open end thereof;
    a second arm secured to said body and extending therefrom in the same general direction as said first arm and spaced therefrom for movement relative to said first arm, said second arm being adapted to project interior of said first panel frame member channel portion through said open end thereof, said second arm including a projecting lock member adapted to project into said aperture of said first panel frame member channel portion and prevent removal of said first and second arms from said first panel frame member channel portion once inserted during normal use of said panel, said second arm being movable toward said first arm sufficient to permit insertion of said first and second arms into said first panel frame member channel portion and having sufficient resiliency to bias said projecting lock member into said aperture of said first panel frame member channel portion when aligned therewith and removably hold said projecting lock member locked within said aperture during normal use of said first panel, said resilient second arm being movable toward said first arm upon selective application of a sufficient actuation release force to remove said projecting lock member from said aperture when it is desired to disconnect said clip from said panel frame member channel portion;
    a rigid third arm rigidly secured to said body and extending therefrom, said third arm being adapted to project interior of said frame member channel portion of said second panel through said open end thereof; and
    a fourth arm secured to said body and extending therefrom in the same general direction as said third arm and spaced therefrom for movement relative to said third arm, said fourth arm being adapted to project interior of said second panel frame member channel portion through said open end thereof, said fourth arm including a projecting lock member adapted to project into said aperture of said second panel frame member channel portion and prevent removal of said third and fourth arms from said second panel frame member channel portion once inserted during normal use of said second panel, said fourth arm being movable toward said third arm sufficient to permit insertion of said third and fourth arms into said second panel frame member channel portion and having sufficient resiliency to bias said projecting lock member into said aperture of said second panel frame member channel portion when aligned therewith and removably hold said projecting lock member locked within said aperture during normal use of said second panel, said resilient fourth arm being movable toward said third arm to permit upon selective application of a sufficient actuation release force to remove said projecting lock member from said aperture when it is desired to disconnect said clip from said second panel frame member channel portion, whereby said clip can be detachably locked to said first and the second panels and thus said first and second panels detachably locked together and held in a desired alignment by said clip, said first and third arms being secured to said body at a predetermined angle to lock said first and second panels together at said predetermined angle.

16. The apparatus as recited in claim 15 wherein said connection member is a post, and said support member has an upper open end portion to receive therein said post of said upper clip and a lower open end portion to receive therein said post of said lower clip, said posts of said upper and lower clips holding said support member in position stationary therebetween during use.

17. The apparatus as recited in claim 15 wherein said first and second panel edge portions each include a recess to partially receive said upper and lower clips and said support member therewithin to permit said first and second panel edge portions adjacent to each other with said upper and lower clips and said support member substantially out of sight of the user.

18. The apparatus as recited in claim 15 wherein said first and third arms are secured to said body at a 180° angle relative to each other.

19. The apparatus as recited in claim 15 wherein said first and third arms are integrally constructed with said body and said connection member.

20. The apparatus as recited in claim 19 wherein said third and fourth arms are integrally constructed with said body and said connection member.

21. The apparatus as recited in claim 15 wherein said first and second panels include panel covering releasably attached to said panel frame members to allow access to said aperture of said upper and lower horizontal frame members for applying a force on said projecting lock members for removal thereof from said aperture to allow said clip to be disconnected.

22. The apparatus as recited in claim 21 usable with brackets to support a shelf, cabinet or other device, wherein said upright support member is slotted to receive corresponding portions of the brackets.

23. The apparatus as recited in claim 15 wherein said second and fourth arms of said upper clip are positioned below said first and third arms thereof, respectively, and said second and fourth arms of said lower clip are positioned above said first and third arms thereof, respectively.

* * * * *

UNITED STATES PATENT AND TRADEMARK OFFICE
CERTIFICATE OF CORRECTION

PATENT NO.   :   4,962,805
DATED        :   October 16, 1990
INVENTOR(S)  :   John M. Allen It is certified that error appears in the above-identified patent and that said Letters Patent is hereby corrected as shown below:

In claim 1, column 5, line 22, please delete "coupled" and substitute therefor, --couple--.

In claim 1, column 5, line 39, please delete "ram" and substitute therefor, --arm--.

In claim 11, column 8, line 65, please delete "f" and substitute therefor, --of--.

In claim 15, column 9, line 44, please delete "upper" and substitute therefor, --support--.

In claim 15, column 9, line 56, please delete "boy" and substitute therefor, --body--.

In claim 15, column 10, line 7, after "said", please insert --first--.

Signed and Sealed this

Seventeenth Day of March, 1992

*Attest:*

HARRY F. MANBECK, JR.

*Attesting Officer*     *Commissioner of Patents and Trademarks*